(12) United States Patent
Gunzburger

(10) Patent No.: US 7,775,484 B2
(45) Date of Patent: Aug. 17, 2010

(54) CABLE TIE WITH ELECTRICAL CONNECTOR FASTENER

(75) Inventor: Paul Gunzburger, Brighton, MA (US)

(73) Assignee: Avery Dennison Corporation, Pasadena, CA (US)

( * ) Notice: Subject to any disclaimer, the term of this patent is extended or adjusted under 35 U.S.C. 154(b) by 213 days.

(21) Appl. No.: 12/002,822

(22) Filed: Dec. 19, 2007

(65) Prior Publication Data

US 2008/0164383 A1 Jul. 10, 2008

Related U.S. Application Data

(60) Provisional application No. 60/876,677, filed on Dec. 22, 2006.

(51) Int. Cl.
*F16L 3/08* (2006.01)

(52) U.S. Cl. .................................................. 248/74.3

(58) Field of Classification Search ................ 248/68.1, 248/73, 74.1, 74.3
See application file for complete search history.

(56) References Cited

U.S. PATENT DOCUMENTS

| | | | |
|---|---|---|---|
| 3,518,727 A | 7/1970 | Eberle | |
| 3,942,750 A | 3/1976 | Noorily | |
| 4,447,934 A | 5/1984 | Anscher | |
| 4,766,651 A | 8/1988 | Kobayashi et al. | |
| 5,065,562 A | 11/1991 | Larsen et al. | |
| 5,112,013 A | 5/1992 | Tolbert et al. | |
| 5,135,188 A | 8/1992 | Anderson et al. | |
| 5,224,244 A | 7/1993 | Ikeda et al. | |
| 5,597,280 A | 1/1997 | Stern | |
| 6,119,314 A | 9/2000 | Freed | |
| 6,186,451 B1 | 2/2001 | Benoit | |
| 6,253,421 B1 | 7/2001 | Kraus | |
| 6,382,570 B1 | 5/2002 | Simpson et al. | |
| 6,550,723 B2 | 4/2003 | Fraley, II et al. | |
| 6,685,144 B1 | 2/2004 | Wochnick | |
| 6,718,597 B2 | 4/2004 | Geiger | |
| 6,764,050 B2 | 7/2004 | Takenaga | |
| 6,827,316 B1 | 12/2004 | Arai | |
| 7,055,784 B2 | 6/2006 | Stigler | |
| 7,392,967 B2 * | 7/2008 | Liaw et al. ............... 248/218.4 |
| 2007/0007398 A1 * | 1/2007 | Franks ...................... 248/74.3 |
| 2008/0250609 A1 * | 10/2008 | Franks ...................... 24/16 R |

* cited by examiner

*Primary Examiner*—J. Allen Shriver, II
*Assistant Examiner*—Erin Smith
(74) *Attorney, Agent, or Firm*—Kriegsman & Kriegsman

(57) ABSTRACT

A cable tie includes a serrated strap which is fitted to an apertured head. In use, the cable tie can be formed into closed loop around an electrical harness cable by inserting the serrated strap through the apertured head. The cable tie additionally includes a fastener which can be used to secure an unattached electrical connector securely against the electrical harness cable. The fastener comprises a rectangular platform that includes a convex outer wall and a flat inner wall that are partially separated by a transverse slot. The platform is shaped to define a pair of opposing, inwardly extending notches which enable the platform to be slid into engagement with corresponding railings formed on the electrical connector. A ratchet-shaped tooth is formed on the convex outer wall to engage a corresponding pawl formed on the electrical connector to lockably retain the fastener coupled to the electrical connector.

16 Claims, 9 Drawing Sheets

CABLE TIE WITH ELECTRICAL CONNECTOR FASTENER

CROSS-REFERENCE TO RELATED APPLICATIONS

The present application claims the benefit under 35 U.S.C. 119(e) of U.S. provisional Patent Application Ser. No. 60/876,677, filed on Dec. 22, 2006, the disclosure of which is incorporated herein by reference.

BACKGROUND OF THE INVENTION

The present invention relates generally to cable ties and more particularly to cable ties that are designed for use in automotive applications.

In the automotive industry, an electrical harness is commonly utilized to simplify the process of connecting various electrical components that are installed in a vehicle (e.g., a radio, lighter, headlights, etc.) with a designated power source, such as a car battery. The electrical harness commonly includes a plurality of bundled electrical wires and a plurality of electrical connectors that are electrically coupled to the wires at various locations along the length of the harness. As can be appreciated, the harness is typically constructed outside the vehicle and is arranged in such a configuration that enables the harness to fit easily within the automobile with each electrical connector located in close proximity to a corresponding component installed in the vehicle.

The plurality of electrical wires used to form the harness is commonly retained in its desired configuration using a plurality of harnessing devices, such as cable ties. One type of cable tie which is well known in the art includes a serrated strap which is fitted to an apertured head. In use, the cable tie can be formed into closed loop by inserting the serrated strap through the apertured head. With the serrated strap inserted through the apertured head, an internal pawl, or locking tang, disposed within the apertured head lockably engages the serrations of the strap to prevent the strap from being backed out of the apertured head. In this manner, the engagement of the internal pawl onto the serrated strap secures the cable tie in its closed loop configuration.

Each electrical connector provided in the harness is typically designated for mating engagement with a particular component. However, if a particular component is not installed in the vehicle, the unattached electrical connector remains loose within the automotive body, thereby rendering it susceptible to bouncing and rattling during operation of the vehicle, which is highly undesirable.

Accordingly, electrical connectors are commonly provided with fastening means to secure an otherwise unattached connector to a fixed object, such as an automotive panel. The fastening means provided on an electrical connector is often in the form of a pair of spaced apart rails which together define a fastener track therebetween. In addition, a locking projection is typically formed on the connector at one end of the fastener track in order to lock the electrical connector in connection with a mating fastener.

For example, it is well-known in the art for a cable tie to be provided with a fastener that is specifically designed to engage the fastening means provided on a standard electrical connector. In this manner, it is to be understood that the cable tie can be formed into a closed loop that is cinched tightly around a harness cable. With the cable tie firmly secured around a portion of the harness, the unattached electrical connector is folded back towards the cable tie. A fastener provided on the cable tie is then slid into connection with the fastening means provided on the electrical connector in order to permanently secure the electrical connector fixed in place against the harness, which is highly desirable.

In U.S. Pat. No. 6,186,451 to J. C. Benoit, which is hereby incorporated by reference, there is disclosed a cable tie for securing a connector to a cable of a harness, the connector having a pair of rails which together form a track therebetween. The cable tie comprises an elongated flexible strap having a first end and a second end. A locking head is integrally formed on the first end of the strap and is adapted to cooperate with the strap to form a loop around the cable. The cable tie further comprises a rigid, bow-shaped fastener coupled to the strap which is sized and shaped to slide into the track formed in the connector. In one embodiment, the fastener of the cable tie is integrally formed on the strap. In another embodiment, the fastener of the cable tie and the strap are two separate pieces, thereby enabling the fastener to slide along the strap.

Although well known and widely used in commerce, the fastener disclosed in the '451 patent suffers from a notable drawback. Specifically, as the fastener is slid within the fastener track in the electrical connector, one end of the tab is required to temporarily slide over the projection formed between the pair of rails. Because the rigid tab is held firmly down by the pair of opposing rails, the above-described sliding process can only be accomplished if the locking projection on the electrical connector is located at one end or, in the alternative, just outside of one end of the fastener track. As a result, it has been found that the fastener disclosed in the '451 patent is incapable of being used with many common types of conventional electrical connectors, which is highly undesirable.

SUMMARY OF THE INVENTION

It is an object of the present invention to provide a new and improved cable tie which includes a serrated strap fitted to an apertured head.

It is another object of the present invention to a cable tie of the type as described above which further includes a fastener that is designed to be attached to an electrical connector.

It is still another object of the present invention to provide a cable tie of the type as described above which includes a limited number of parts, which is easy to use and which is inexpensive to manufacture.

Accordingly, there is provided a cable tie adapted to be coupled to an electrical connector, the cable tie comprising (a) a head shaped to define a strap accepting channel, the head comprising a locking member which is disposed to project into the strap accepting channel, (b) a strap formed onto the head, the strap being sized and shaped to be both inserted into the strap accepting channel and engaged by the locking member, (c) a fastener coupled to the head, the fastener comprising, (i) a platform, and (ii) an engagement tooth formed on the platform.

Various other features and advantages will appear from the description to follow. In the description, reference is made to the accompanying drawings which form a part thereof, and in which is shown by way of illustration, an embodiment for practicing the invention. The embodiment will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate an embodiment of the present invention and, together with the description, serve to explain the principles of the invention. In the drawings, wherein like reference numerals represent like parts.

DETAILED DESCRIPTION OF A PREFERRED EMBODIMENT

Figure 1:
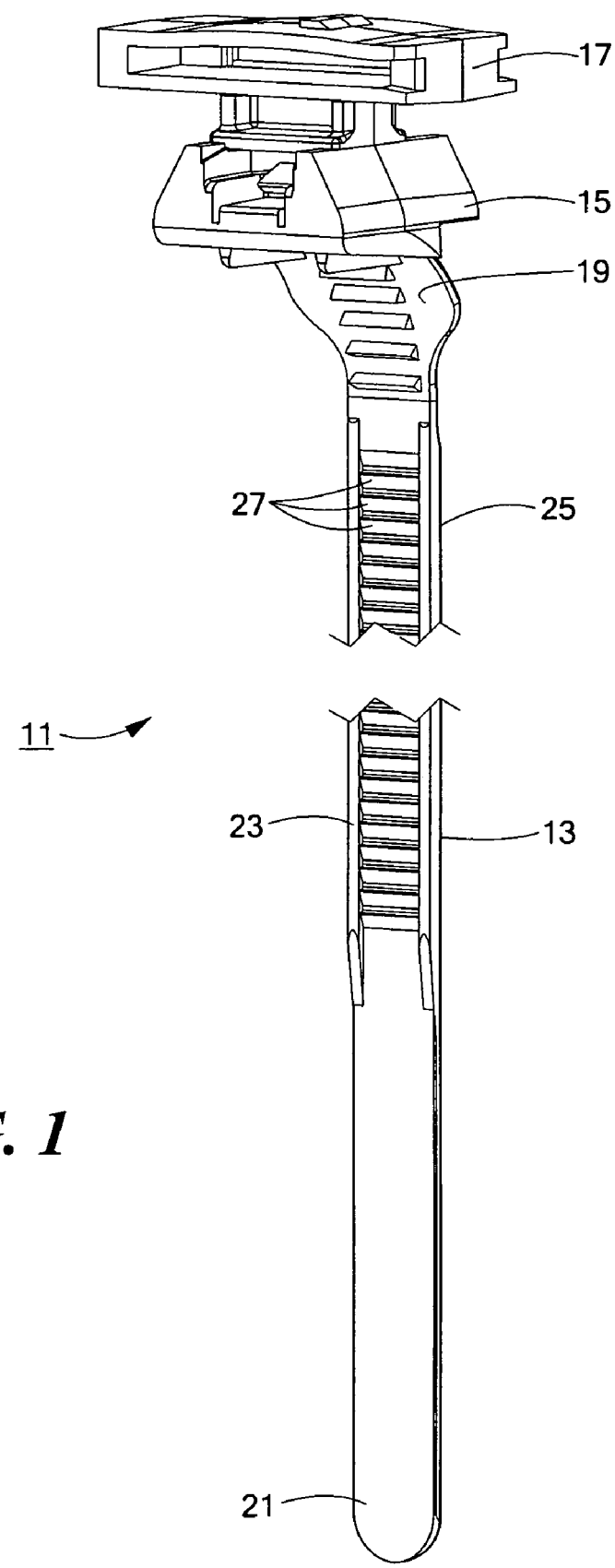
FIG. 1 is a fragmentary, front perspective view of a cable tie constructed according to the teachings of the present invention.

Referring now to FIG. 1, there is shown a front perspective view of a cable tie constructed according to the teachings of the present invention, the cable tie being identified generally by reference numeral 11. As will be described further in detail below, cable tie 11 is designed to both (i) wrap tightly around a bundle, such as a plurality of individual electrical wires, and (ii) fixedly secure a loose electrical connector against the cinched bundle.

Cable tie 11 is a one piece tie which includes an elongated strap 13, a locking head 15 and a fastener 17. Preferably, cable tie 11 is constructed from a durable and inexpensive material, such as plastic, nylon or a high modulus elastomer, using conventional molding techniques.

Elongated strap 13 is preferably flexible in nature and includes a first end 19, a second end 21, a front surface 23 and a bottom surface 25. A plurality of ratchet-shaped teeth 27 are integrally formed into front surface 23 along the majority of its length.

Figure 2:
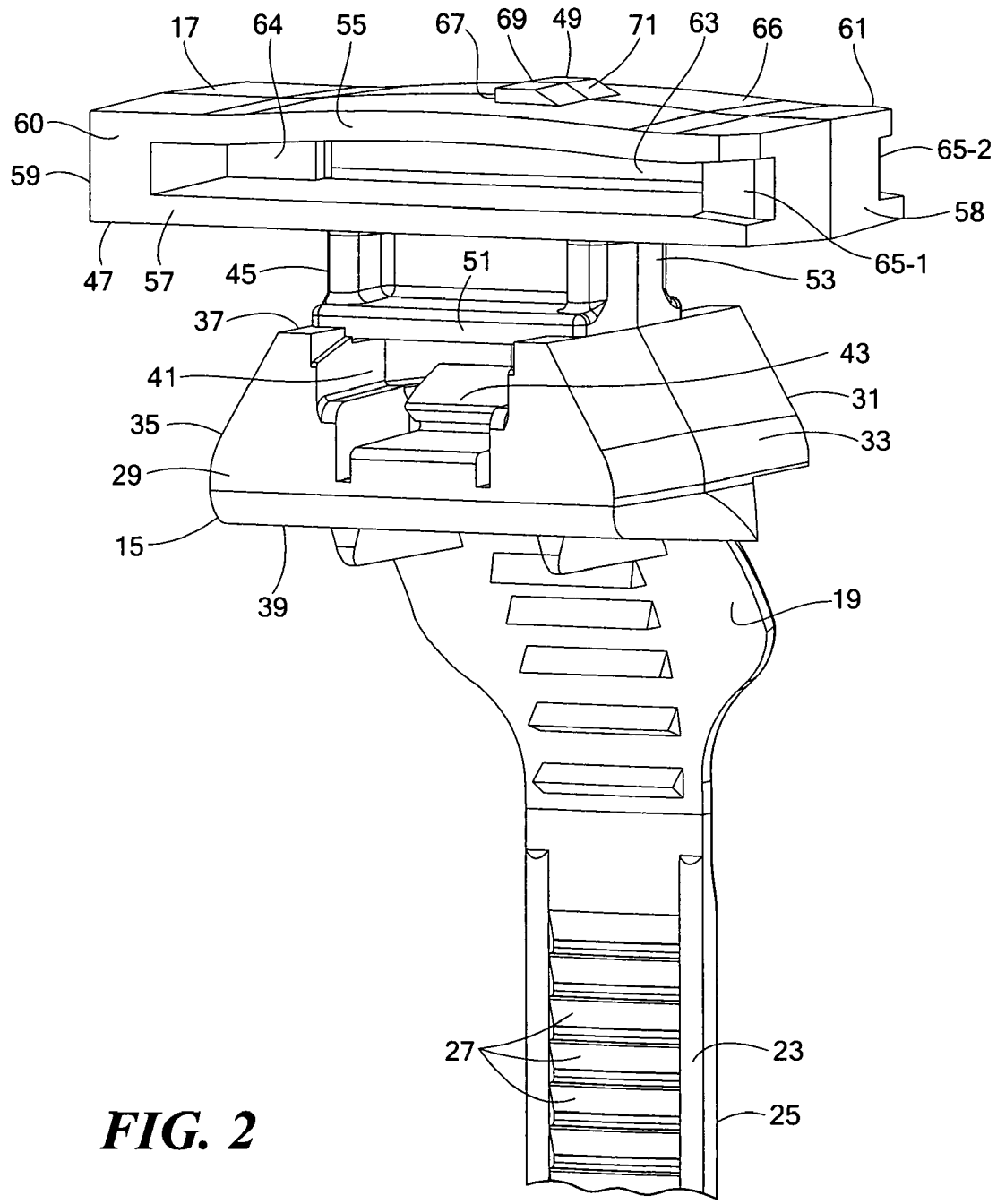
FIG. 2 is an enlarged, fragmentary front perspective view of the cable tie shown in FIG. 1.
Figure 3:
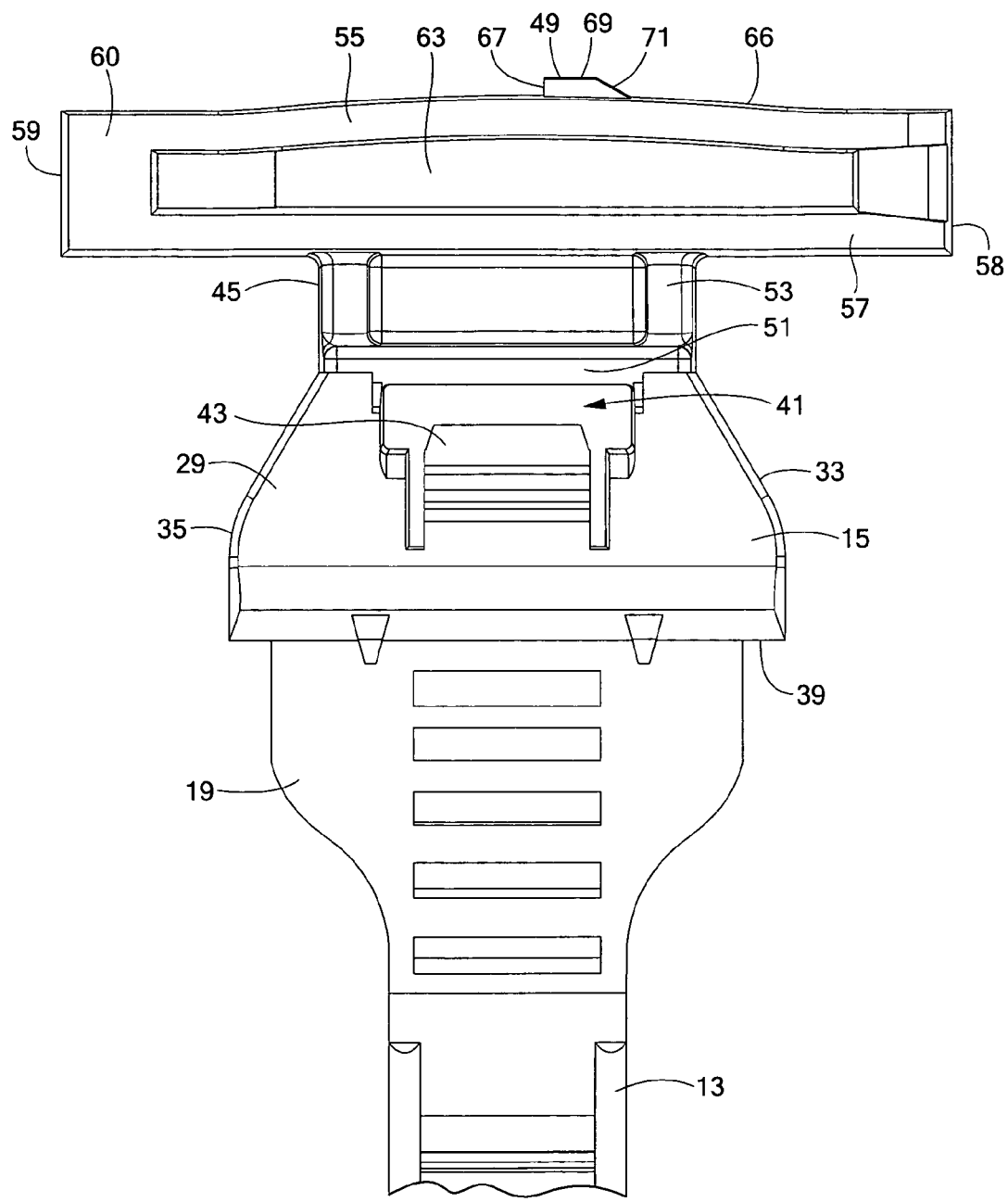
FIG. 3 is an enlarged, fragmentary front plan view of the cable tie shown in FIG. 1.

As seen most clearly in FIGS. 2 and 3, locking head 15 includes a front surface 29, a rear surface 31, a right side surface 33, a left side surface 35, an open top surface 37 and a bottom surface 39 which together at least partially define a strap accepting channel 41 that extends through locking head 15 from front surface 29 to rear surface 31. A pivotable locking pawl 43 is formed in locking head 15 and is configured to project into strap accepting channel 41, pawl 43 being designed to engage teeth 27 on strap 13, as will be described further below.

First end 19 of elongated strap 13 is integrally formed onto bottom surface 39 of locking head 15. In this manner, strap 13 and head 15 enable tie 11 to be wrapped tightly around a bundle, such as a plurality of electrical wires, in the following manner. Specifically, second end 21 of strap 13 is wrapped around the bundle and is inserted through strap accepting channel 41 to form a closed loop. Second end 21 is further advanced through strap accepting channel 41 to reduce the size of the closed loop, thereby drawing strap 13 tightly around the bundle. As second end 21 is fed through strap accepting channel 41, locking pawl 43 sequentially engages individual ratchet teeth 27 to prevent extraction of strap 13 from strap accepting channel 41. With cable tie 11 cinched tightly around the bundle, fastener 17 can then be used to secure a loose electrical connector against the bundle to prevent the electrical connector from moving (e.g., rattling), as will be described further below.

Fastener 17 includes a stem 45, a platform 47 and an engagement tooth 49. As can be appreciated, the particular construction of fastener 17 serves as a principal novel feature of the present invention.

Stem 45 comprises a rectangular base 51 which is integrally formed onto locking head 15, base 51 extending transversely across open top surface 37 in such a manner so as to partially enclose strap accepting channel 41. Stem 45 additionally includes a neck 53 which is generally I-shaped in lateral cross-section, neck 53 extending orthogonally out from the top surface of base 51.

Platform 47 is integrally formed onto the free end of stem 45 (i.e., on the free end of neck 53). In this manner, it is to be understood that stem 45 serves to space platform 47 away from locking head 15.

Platform 47 is a unitary member that includes an outer, or top, wall 55, an inner, or bottom, wall 57, a right end wall 58, a left end wall 59, a front wall 60 and a rear wall 61 which together define a narrow, transverse slot 63 that extends transversely through platform 47 from front wall 60 to rear wall 61. As can be appreciated, the inclusion of slot 63 in platform 47 enables a portion of outer wall 55 to flex slightly inward towards inner wall 57 upon the application of a suitable compressive force onto fastener 17. Preferably, a thin interior wall 64 extends partially into slot 63 from the inner surface of left end wall 59. As can be appreciated, interior wall 64 provides platform 47 with adequate support when outer wall 55 is flexed inward towards inner wall 57.

Each of outer and inner walls 55 and 57 is in the form of a thin, rectangular plate, the majority of walls 55 and 57 being spaced apart from one another by slot 63. As can be seen, outer wall 55 has a slight outward bow at its approximate midpoint, thereby providing outer wall 55 with a generally convex shape in longitudinal cross-section. As will be explained further below, the convex shape of outer wall 55 serves to facilitate the process of coupling fastener 17 to an electrical connector.

As seen most clearly in FIG. 2, right end wall 58 is shaped to define a pair of opposing notches 65-1 and 65-2 which extend inward from front and rear walls 60 and 61, respectively. Each notch 65 is generally rectangular in lateral cross-section and is sized and shaped to fittingly receive a corresponding railing which is provided on the electrical connector to which fastener 17 is coupled, as will be described further below.

Engagement tooth 49 is integrally formed on top surface 66 of outer wall 55 at its approximate center and extends outwardly therefrom. Engagement tooth 49 is generally ratchet shaped and includes an abutment surface 67 which extends out from outer wall 55 at an approximate right angle relative thereto, a top surface 69 which is approximately in parallel to outer wall 55 and an angled surface 71 which gradually tapers from top surface 69 to outer wall 55 in the direction towards right end wall 58. As will be described further below, tooth 49 engages a corresponding projection formed on a mating electrical connector in order to retain fastener 17 secured to the electrical connector.

Figure 4A:
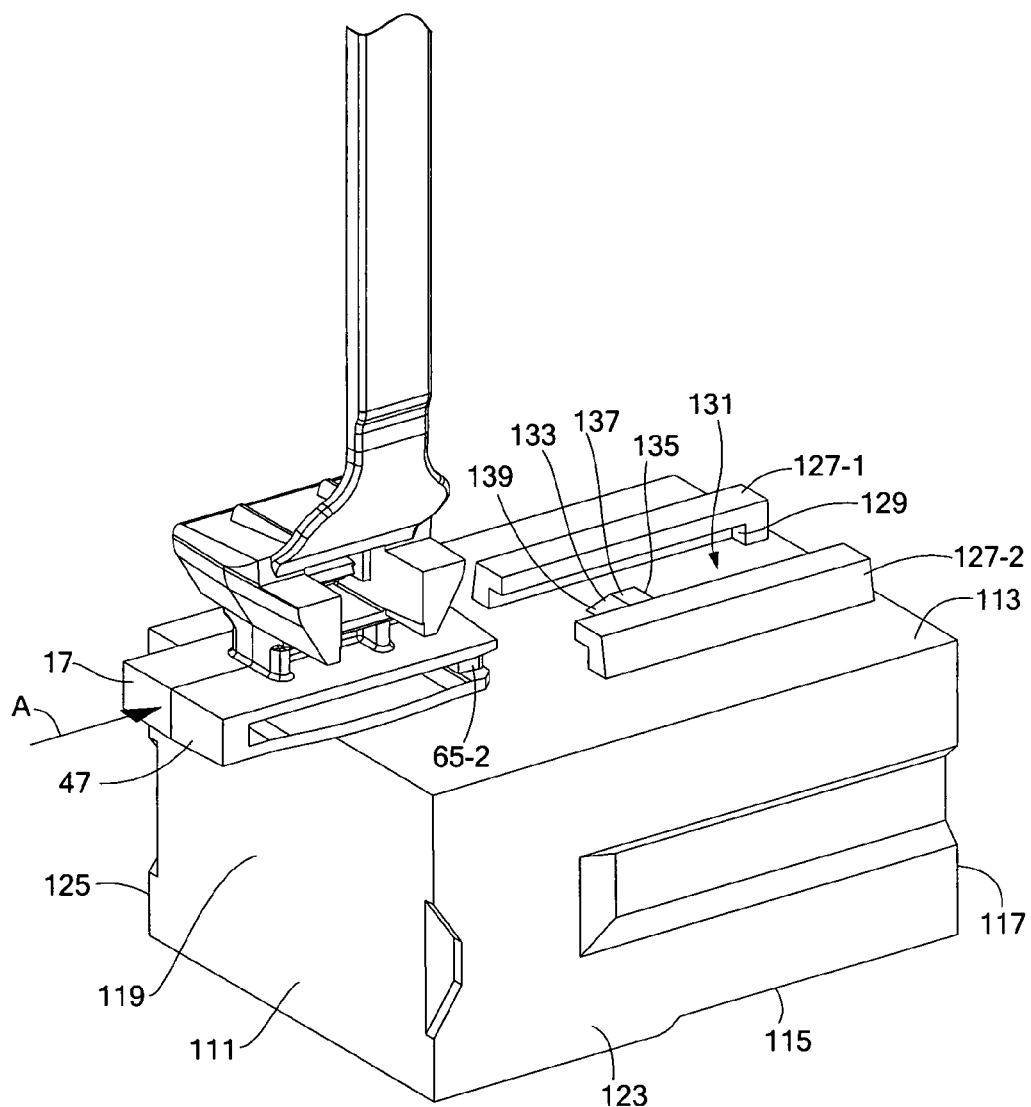
FIGS. 4(a)-(c) are a series of fragmentary, bottom perspective views of the cable tie shown in FIG. 1 at various stages during the process of attaching the cable tie to an electrical connector.
Figure 4B:
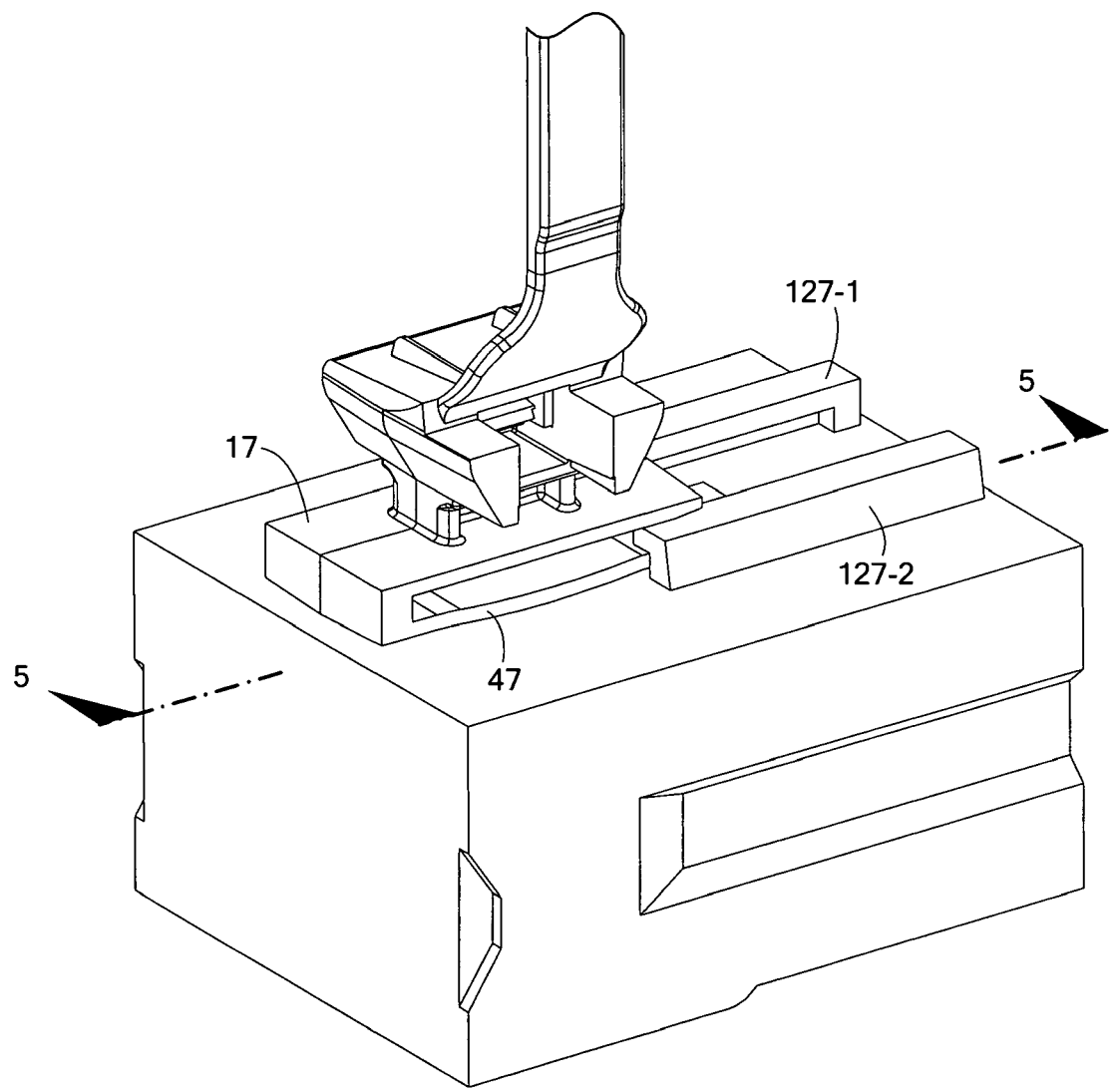
Figure 4C:
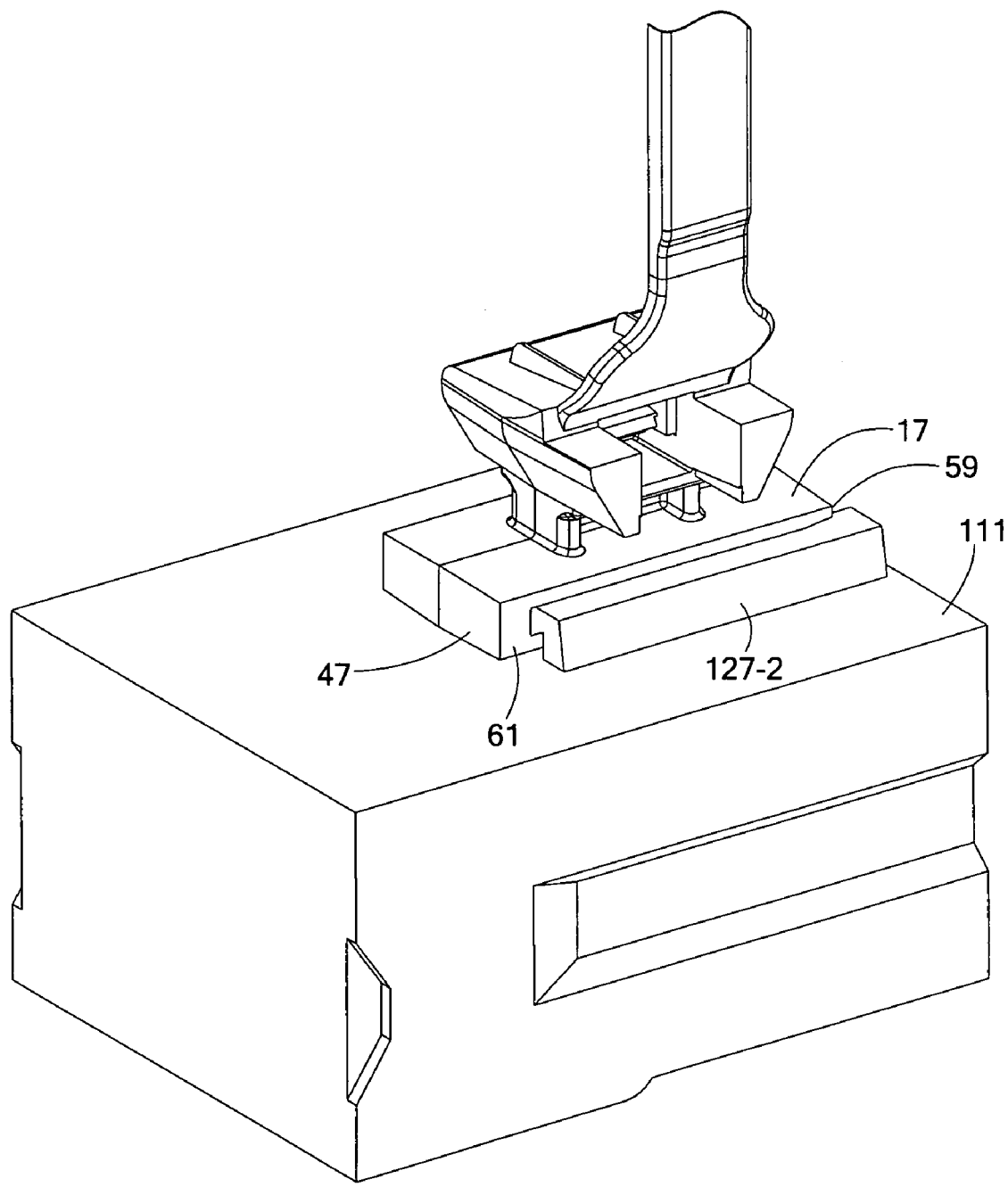

As noted briefly above, fastener 17 is designed to be fixedly secured to an electrical connector. Referring now to FIGS. 4(a)-(c), there is shown one particular type of electrical connector 111 to which fastener 17 may be coupled. Specifically, electrical connector 111 is represented herein as being the form of an electrical connector that is presently manufactured by Yazaki North America as part of its "NS" line. As can be seen, electrical connector 111 has a generally box-shaped design and includes a top wall 113, a bottom wall 115, a front wall 117, a rear wall 119 and a pair of side walls 123 and 125. A plurality of contacts (not shown) is formed into front wall 117 which enable electrical connector 111 to be electrically connected to a mating connector (e.g., an electrical connector for an automotive component which requires electrical power, such as a radio, cigarette lighter or headlight).

As can be seen, a pair of spaced apart, inverted L-shaped guide rails 127-1 and 127-2 extend orthogonally up from top wall 113 of connector 111, the free ends of the pair of guide rails 127-1 and 127-2 extending inward towards one another. A vertical stop 129 extends down from the free end of each guide rail 127 to top wall 113 along front wall 117, the function of each stop 129 to become apparent below. Together, guide rails 127 define a longitudinally extending channel 131 which is sized and shaped to receive fastener 17, as will be described further in detail below. In addition, a fixed pawl 133 is formed onto top wall 113 between guide rails 127. Pawl 133 is generally ratchet shaped and includes an abutment surface 135 which extends vertically up from top wall 113 at an approximate right angle relative thereto, a flat top surface 137 which lies parallel with top wall 113 and an angled surface 139 which gradually tapers from top surface 137 to top wall 113 in the direction towards rear wall 119.

In use, fastener 17 may be secured to connector 111 in the following manner. Specifically, as shown in FIG. 4(a), fastener 17 is inverted and positioned such that the rear ends of guide rails 127 align within notches 65 in platform 47. With fastener 17 aligned as such behind guide rails 127, fastener 17 is advanced longitudinally forward through channel 131 in connector 111, as represented by arrow A. Referring now to FIG. 4(b), as fastener 17 is advanced forward, the free end of each guide rail 127 fittingly protrudes into a corresponding notch 65 in platform 47 to limit displacement of fastener 17 along a substantially linear path (i.e., in the direction of arrow A).

Figure 5A:
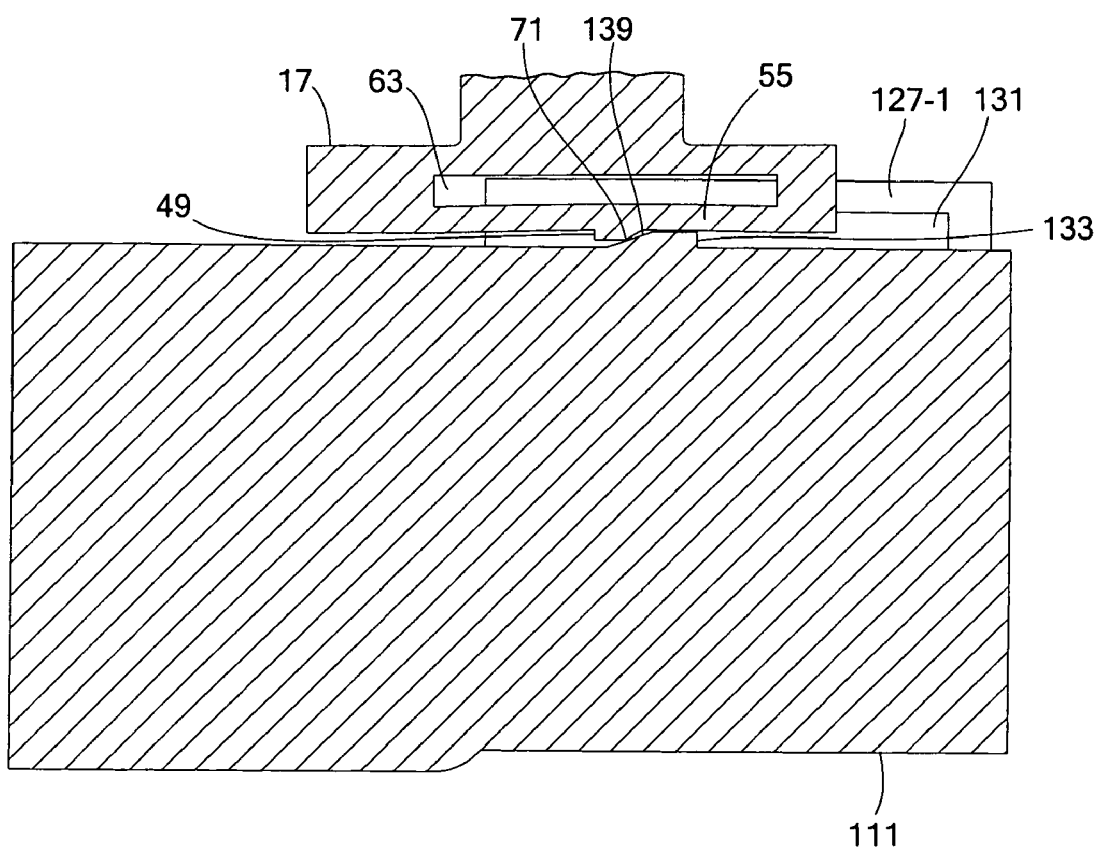
FIGS. 5(a)-(c) are series of fragmentary, section views of the cable tie and electrical connector shown in FIG. 4(b) taken along lines 5-5 at various stages of the attachment process as the tooth on the fastener slides over the pawl formed on the electrical connector.
Figure 5B:
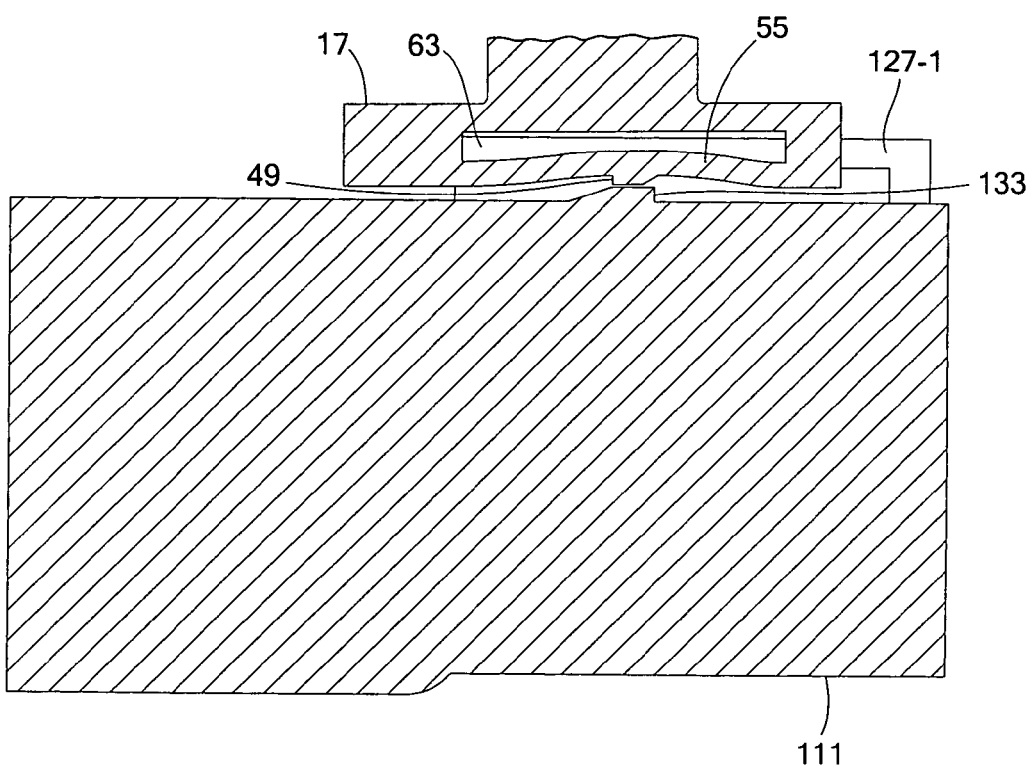
Figure 5C:
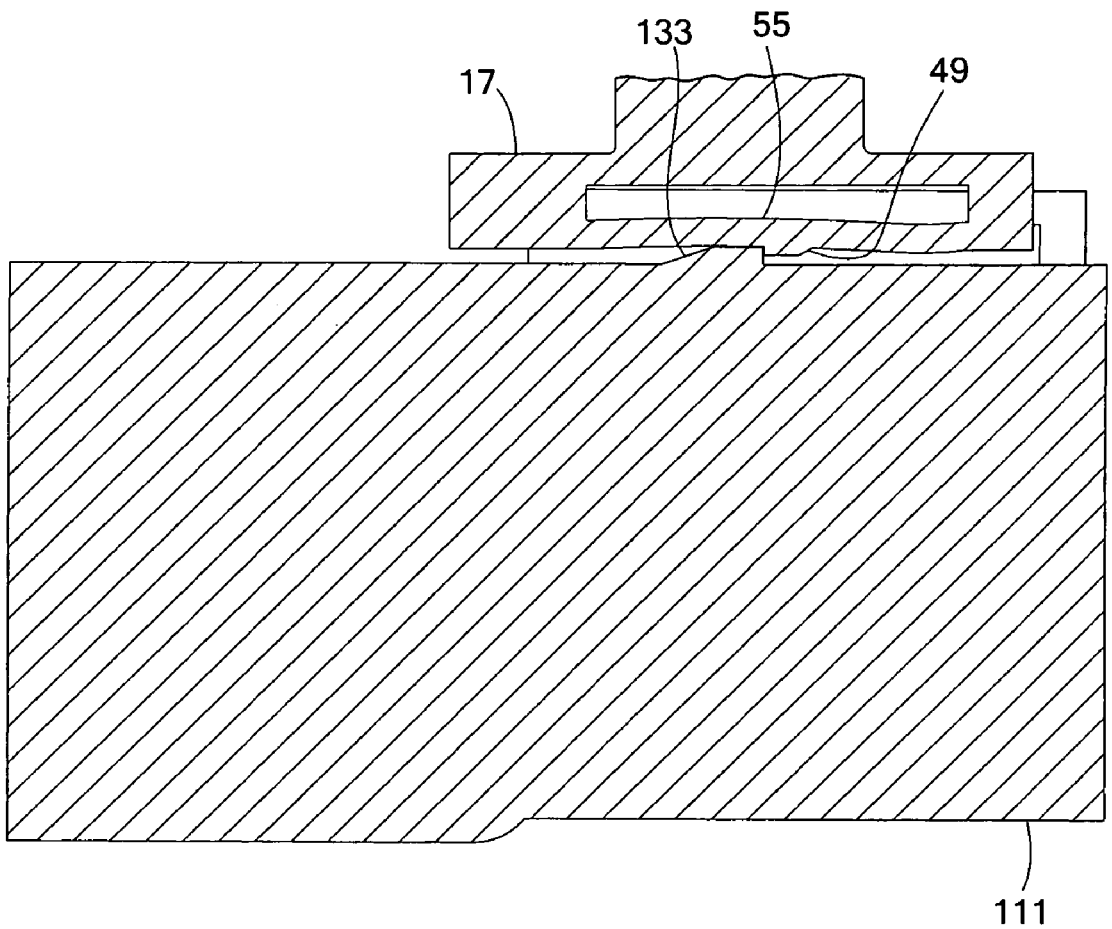

As seen most clearly in FIG. 5(a), due to the outwardly bowed design of outer wall 55, continued longitudinal advancement of fastener 17 within channel 131 draws angled surface 71 of tooth 49 into direct contact against angled surface 139 of pawl 133. As fastener 17 is further advanced, tooth 49 on fastener 17 slides on top of pawl 133 on connector 111. The force applied onto tooth 49 by pawl 133 (e.g., with top surface 137 disposed in firm contact against top surface 69) causes outer wall 55 to flex inward to the degree necessary for tooth 49 to advance past pawl 133, as shown in FIG. 5(b). Once tooth 49 advances past pawl 133, the inwardly compressed outer wall 55 resiliently snaps back into its original configuration, as shown in FIG. 5(c). As a result, it is to be understood that any rearward displacement of fastener 17 relative to connector 111 draws abutment surface 67 on tooth 49 against abutment surface 135 on pawl 133, thereby retaining fastener 17 fixedly coupled to connector 111.

As seen most clearly in FIG. 4(c), further forward displacement of fastener 17 simultaneously results in both (i) the contact of right end wall 59 of fastener 17 against stops 129 and (ii) the contact of the rear surface of guide rails 127 against left end wall 61 of fastener 17, thereby limiting further forward advancement of fastener 17 within channel 131. In this manner, it is to be understood that fastener 17 is permanently secured to electrical connector 111.

The embodiment of the present invention described above is intended to be merely exemplary and those skilled in the art shall be able to make numerous variations and modifications to them without departing from the spirit of the present invention. All such variations and modifications are intended to be within the scope of the present invention as defined in the appended claims.

What is claimed is:

1. A cable tie adapted to be coupled to an electrical connector, the cable tie comprising:
   (a) a head shaped to include a front surface, a rear surface, a right side surface, a left side surface, a top surface and a bottom surface that together at least partially define a strap accepting channel, the head comprising a locking member which is disposed to project into the strap accepting channel;
   (b) a strap formed onto the bottom surface of the head, the strap being sized and shaped to be both inserted into the strap accepting channel and engaged by the locking member; and
   (c) a fastener coupled to the top surface of the head, the fastener comprising,
      (i) a platform shaped to include an outer wall and an inner wall, the inner end wall extending generally in parallel with the top surface of the head, and
      (ii) a rigid, non-movable engagement tooth formed on the outer wall of the platform and projecting outwardly therefrom away from the head,
      (iii) wherein the platform is shaped to define a transverse slot between its outer wall and its inner wall, the slot enabling at least a portion of the outer wall to displace inward towards the inner wall upon the application of a suitable force thereon.

2. The cable tie as claimed in claim 1 wherein the slot extends transversely through the platform in alignment beneath the engagement tooth.

3. The cable tie as claimed in claim 1 wherein the platform additionally includes a first end wall, a second end wall, a front wall and a rear wall.

4. The cable tie as claimed in claim 3 wherein the slot extends transversely through the platform from its front wall to its rear wall.

5. The cable tie as claimed in claim 1 wherein at least a portion of the outer wall is bowed away from the inner wall.

6. The cable tie as claimed in claim 3 wherein the platform is shaped to define a pair of opposing, inwardly extending notches in its front and rear walls.

7. The cable tie as claimed in claim 3 wherein the outer wall includes a top surface on which the engagement tooth is mounted.

8. The cable tie as claimed in claim 7 wherein the tooth is generally ratchet shaped.

9. The cable tie as claimed in claim 3 further comprising a stem for spacing the platform away from the head.

10. The cable tie as claimed in claim 9 wherein the stem comprises:
    (a) a rectangular base formed on the top surface of the head, and
    (b) a neck extending orthogonally out from the base on which the platform is mounted.

11. The cable tie as claimed in claim 10 wherein the neck is generally I-shaped in lateral cross-section.

12. A fastener adapted to be coupled to an electrical connector, the fastener comprising:
    (a) a generally planar platform comprising an outer wall, an inner wall, a first end wall, a second end wall, a front wall and a rear wall which together define a slot that extends transversely through the platform from its front wall to its rear wall, the slot enabling at least a portion of the outer wall to flex inwardly towards the inner wall upon the application of a suitable force thereon, and
    (b) a rigid, non-movable engagement tooth formed on the outer wall of the platform and projection outwardly therefrom in the direction away from the inner wall.

13. The fastener as claimed in claim 12 wherein at least a portion of the outer wall is bowed away from the inner wall.

14. The fastener as claimed in claim 12 wherein the platform is shaped to define a pair of opposing, inwardly extending notches in its front and rear walls.

15. The fastener as claimed in claim 12 wherein the outer wall includes a top surface on which the engagement tooth is mounted.

16. The fastener as claimed in claim 15 wherein the tooth is generally ratchet shaped.

* * * * *